Feb. 27, 1951 M. DENIS 2,543,621

DISCRIMINATOR FOR FREQUENCY MODULATED CENTIMETRIC AND DECIMETRIC WAVES

Filed June 16, 1948 2 Sheets-Sheet 1

INVENTOR
MARCEL DENIS
By Haseltine, Lake & Co.
AGENTS

Feb. 27, 1951 M. DENIS 2,543,621

DISCRIMINATOR FOR FREQUENCY MODULATED
CENTIMETRIC AND DECIMETRIC WAVES

Filed June 16, 1948 2 Sheets-Sheet 2

INVENTOR
MARCEL DENIS
By Haseltine, Lake & Co.
AGENTS

Patented Feb. 27, 1951

2,543,621

UNITED STATES PATENT OFFICE 2,543,621

DISCRIMINATOR FOR FREQUENCY-MODULATED CENTIMETRIC AND DECIMETRIC WAVES

Marcel Denis, Paris, France, assignor to Compagnie Generale de Telegraphie Sans Fil, a corporation of France Application June 16, 1948, Serial No. 33,256
In France July 11, 1947

7 Claims. (Cl. 250—20)

The present invention relates to a discriminator for frequently modulated centimetric and decimetric waves.

Devices are known which permit the extraction, from an ultrashort wave modulated both in frequency (or phase) and in amplitude, of a signal which is substantially proportional to the modulating signal. All such devices are modifications of a broad device which will be briefly described for the sake of clarity.

Let $$U = U_0 g[2\pi ft] \sin 2\pi[Ft + \Delta F \int h(2\pi ft)\,dt]$$

be a hyperfrequency signal modulated both in frequency and in amplitude wherein F is the hyperfrequency (carrier frequency), $f$ the low, modulating frequency, $\Delta F$ the depth of frequency modulation, $h(2\pi ft)$ a periodic signal of frequency $f$ and $g[2\pi ft]$ the amplitude modulation, also periodic.

The instantaneous frequency may be written as $$F + \Delta F h(2\pi ft)$$

The problem consists in extracting from complex wave U a signal proportional to $\Delta F h(2\pi ft)$.

According to known methods, the first step is to effect a frequency change which transforms signal U at frequency F into a signal $U_m$ of mean carrier frequency $F_m$; the two modulations in amplitude and frequency are carried through into the new signal. After amplification, which requires the use of mean frequency amplifiers having a band directly proportional to the modulation depth $\Delta F$, signal $U_m$ is fed to an amplitude limiter which suppresses the amplitude modulation $g[2\pi ft]$ and reduces the noise influence, then to a "discriminator" device, of known construction, which permits the extraction of the modulating signal $\Delta F h(2\pi ft)$.

Such devices, which are generally of a complicated nature, require the use of an auxiliary generator supplying a fixed frequency $F' = F \pm F_m$. Frequencies F' and F must be well stabilized in order that the instantaneous frequencies remain within the limits of the pass-band of the mean frequency amplifiers and of the discriminator. Moreover, such a circuit gives a linear frequency detection only for relatively small modulation depths.

With the device according to the present invention, it is possible to avoid most of these disadvantages. The principal object is to provide a discriminating system for ultrashort radioelectric waves, modulated both in amplitude and in frequency, in which the incident wave is received in a portion of a transmission line comprising three detectors having quadratic characteristics and being suitably spaced apart, one of said detectors being adapted to correct the amplitude modulation and the two others being in opposition and providing the discrimination proper, said detectors being associated with a suitable network.

The invention will be more readily understood when described with reference to the accompanying drawings, illustrating the principle whereon the invention is based and some non-limiting examples of putting it into effect, and in which.

Figure 1:
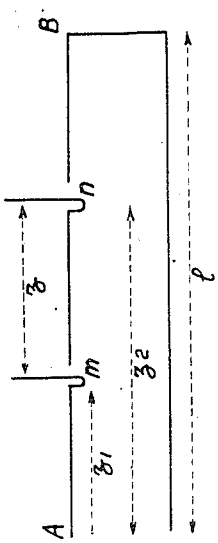
Fig. 1 is a diagram of a portion of a guide with two loops for extracting energy.

Referring to Figure 1, let us assume that a transmission line (guide or coaxial cable) is energized at A by a hyper-frequency signal. The other end B is short circuited and the line is the seat of stationary waves. At two fixed points $m$ and $n$ of the line separated by a distance $z$, the respective fields are a function of the wave-length $\lambda$, of the length $l$ of the line and of the distances $z_1$ and $z_2$ of points $m$ and $n$ from origin A.

Assuming further that for a given wave-length $\lambda_0$ the distance $z_1$, $z_2$ and $l$ are such that the fields at $m$ and $n$ are equal, let us extract, by a method hereinafter described, a signal $a_m$ depending from the amplitude $A_m$ of the field at $m$, and a signal $a_n$ depending from the amplitude $A_n$ of the field at $n$. If signals $a_m$ and $a_n$ are opposed in a suitable device, a complex signal is obtained having characteristics $$S(\lambda) = a_m - a_n$$

for $\lambda = \lambda_0 \; S(\lambda_0) = 0$ for $\lambda < \lambda_0 \; S(\lambda) > 0$ for $\lambda > \lambda_0 \; S(\lambda) < 0$ provided the wave-lengths $\lambda$ remain in the neighborhood of $\lambda_0$.

The problem is solved if $S(\lambda)$ is a linear function, which can be obtained, according to the invention, with the devices hereinafter described.

Figure 2:
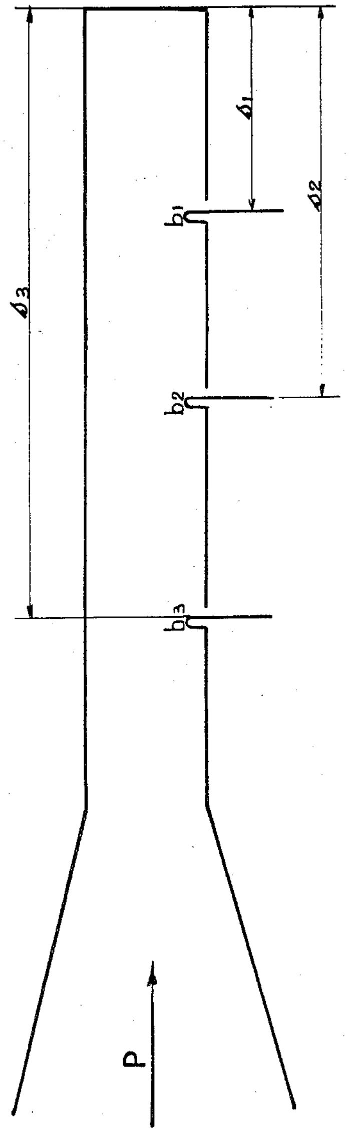
Fig. 2 shows a portion of a guide energized by a horn, having three loops for extracting energy.

A receiving horn is adapted to one end (Fig. 2) of a guide short-circuited at the opposite end B. The horn is assumed to match the characteristic impedance of the guide. Two loops located at $m$ and $n$ extract from the guide currents which are proportional to the fields at those points. These loops are associated with detectors assumed to be "quadratic," whereby the detected currents are proportional to the square of the magnetic fields at $m$ and $n$.

Elementary line theory shows that in this case the amplitude of the field at a point situated at a distance $s_1$ from the extremity B of the line is $$H_{s_1}=kE_0 \cos 2\pi\frac{s_1}{\lambda}$$

wherein $k$ is a proportionality factor, $E_0$ the electromotive field and $\lambda$ the instantaneous wavelength.

Likewise the field at a point $s_2$ is $$H_{s_2}=kE_0 \cos 2\pi\frac{s_2}{\lambda}$$

The detected currents have values $$i_{s_1}=\alpha E_0^2 \cos^2 2\pi\frac{s_1}{\lambda}$$

$$i_{s_2}=\alpha E_0^2 \cos^2 2\pi\frac{s_2}{\lambda}$$

$\alpha$ being a proportionality factor.

Consequently:

$$s(\lambda)=i_{s_1}-i_{s_2}=\alpha E_0^2 \sin\frac{2\pi}{\lambda}(s_1+S_2) \sin\frac{2\pi}{\lambda}(s_1-s_2)$$

Moreover, $E_0^2$ is proportional to the power appearing at the inlet to the guide (which power may be amplitude modulated).

Assuming that $s_1$ and $s_2$ are so selected that for a mean wavelength $\lambda_0$;

$$\sin\frac{2\pi}{\lambda_0}(s_1+s_2)=0$$

$$\sin\frac{2\pi}{\lambda_0}(s_1-s_2)=0$$

then for a wavelength $\lambda=\lambda_0+\Delta\lambda$ $$s(\lambda)=\alpha E_0^2 \sin\left[\frac{2\pi}{\lambda_0}\frac{\Delta\lambda}{\lambda_0}(s_1+s_2)\right]\cos\left[\frac{2\pi}{\lambda_0}\frac{\Delta\lambda}{\lambda_0}(s_1-s_2)\right] \quad \text{(A)}$$

It will be seen that $s(\lambda)$, $\Delta\lambda$ cancel each other out and change signs simultaneously.

In practice it is found that the frequency detection is substantially linear so long as $$\frac{2\pi}{\lambda_0}\left|\frac{\Delta\lambda}{\lambda_0}\right|(s_1+s_2)<\frac{\pi}{10}$$

which is the same as $$\left|\frac{\Delta\lambda}{\lambda_0}\right|<\frac{1}{20}\,\frac{\lambda_0}{s_1+s_2}$$

now if, for example, $$\frac{\lambda_0}{s_1+s_2}=\frac{1}{5}$$

it will be possible to detect, without appreciable distortion, frequency modulated waves having a relative depth of 1% (60 mc./sec. for example on 3000 mc./sec.).

The foregoing discussion assumes that the incident power is not amplitude modulated.

Should there be parasite amplitude modulation, it is necessary to add a third loop $b_3$ associated with a quadratic detector and located at a distance $s_3$ from closed end B, and the detected current will be $$i_{s_3}=\alpha E_0^2 \cos^2\frac{2\pi S_3}{\lambda}$$

If, with the aid of a suitable device, a signal $f(\lambda)$ be produced which is proportional to $$\frac{i_{s_1}-i_{s_2}}{i_{s_3}}$$

it is seen that $f(\lambda)$ is independent of the amplitude modulation:

$$f(\lambda)=\frac{\sin\left[\frac{2\pi}{\lambda}(s_1+s_2)\right]\sin\left[\frac{2\pi}{\lambda}(s_1-s_2)\right]}{\cos^2\frac{2\pi s_3}{\lambda}}$$

If steps are taken so that $$\left(\cos^2\frac{2\pi s_3}{\lambda_0}\right)=1$$

the signal can then be written $$f(\lambda)=\frac{\sin\left[\frac{2\pi}{\lambda_0}\frac{\Delta\lambda}{\lambda_0}(s_1+s_2)\right]\cos\left[\frac{2\pi}{\lambda_0}\frac{\Delta\lambda}{\lambda_0}(s_1-s_2)\right]}{\cos^2\left[\frac{2\pi}{\lambda_0}\frac{\Delta\lambda}{\lambda_0}s_3\right]}$$

In addition to the advantage of making the resultant signal independent of the amplitude modulation, it is seen that the detection remains linear, all other things being otherwise equal, for a deviation ratio $\Delta\lambda/\lambda$ greater than in the first case, and this is due to the presence in the last equation of the term $$\cos^2\left[\frac{2\pi}{\lambda_0}\frac{\Delta\lambda}{\lambda_0}s_3\right]$$

It is possible to construct devices enabling this result to be obtained.

Figure 3:
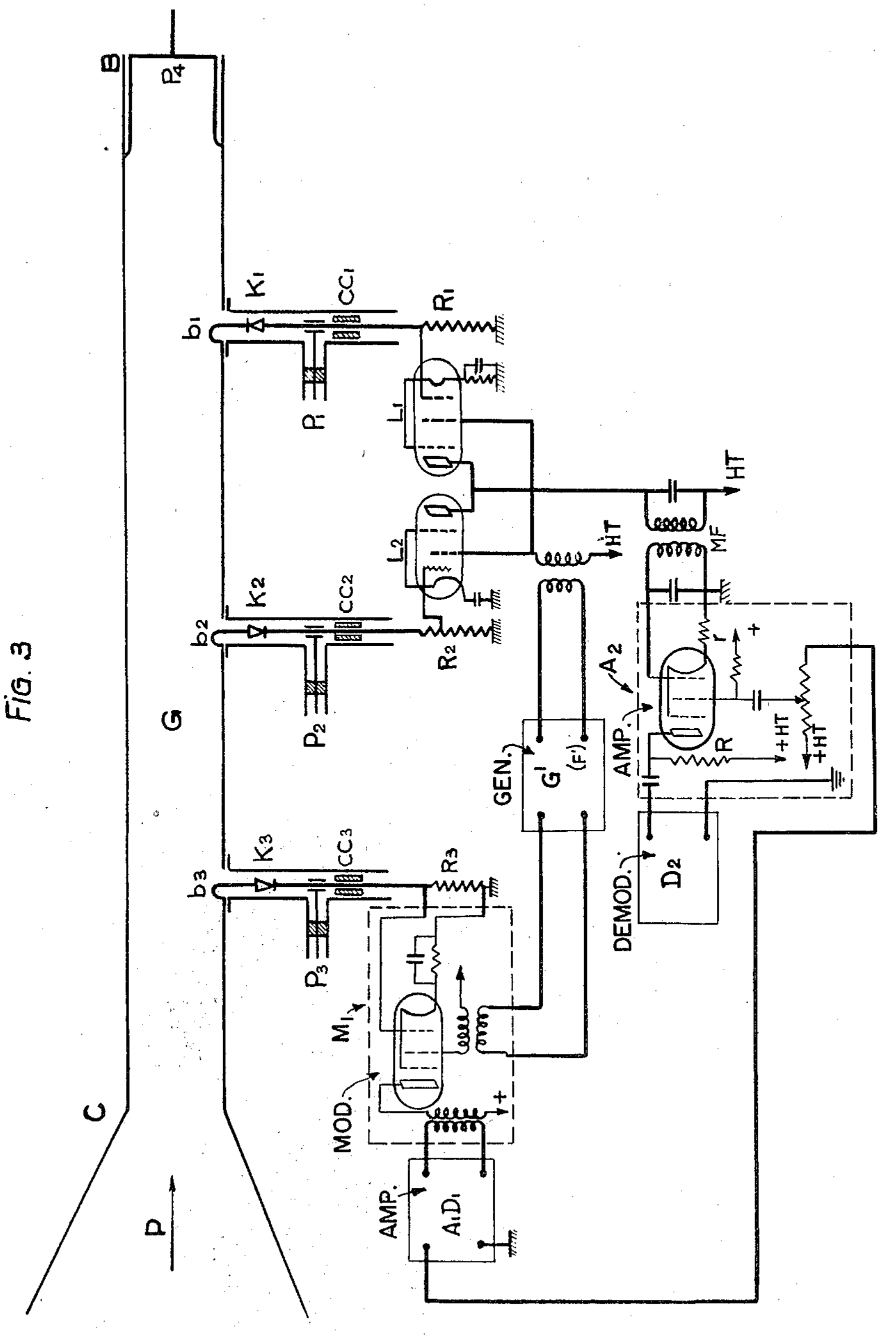
Fig. 3 is a diagram of the means used for putting to work the energy extracted as in Fig. 2.

The circuit diagram of Fig. 3 shows by way of example one way of realizing, according to the invention, a discriminator based on the foregoing discussion.

Power P is fed to guide G through horn C; loops $b_1$, $b_2$ and $b_3$ are associated respectively with coaxial tubes $CC_1$, $CC_2$, and $CC_3$ slidable along the guide for adjustment of the device as a function of mean wavelength $\lambda_0$ and of the maximum deviation ratio $\Delta\lambda/\lambda_0$ to be detected. A piston $P_4$ enables further adjustment. Coaxial tubes $CC_1$, $CC_2$ and $CC_3$ comprise crystals $K_1$, $K_2$ and $K_3$. Seeing that the detectors must be a periodic, short-circuiting pistons $P_1$, $P_2$ and $P_3$ are provided which enable suitable adaptation of the impedances seen from loops $b_1$, $b_2$ and $b_3$. Tubes $CC_1$, $CC_2$ and $CC_3$ end in hyperfrequency short-circuits, and the detected currents $i_{s_1}$, $i_{s_2}$ and $i_{s_3}$ are collected from resistances $R_1$, $R_2$ and $R_3$.

Since it is necessary to introduce the direct current component of the detected currents, signals $i_{s_1}$ and $i_{s_2}$ are fed to the grids of two identical modulating tubes $L_1$ and $L_2$. It will be seen that crystals $K_1$ and $K_2$ are in opposition so that the currents in $R_1$ and $R_2$ are in phase opposition, and the potentials of both grids can be adjusted if resistances $R_1$ and $R_2$ are variable potentiometers. Modulation frequency F′ must be sufficiently greater than the greatest modulation frequency (approximately 20 times). The amplitude of the potential collected from the anodes of tubes $L_1$ and $L_2$, which is proportional to $(i_{s_1}-i_{s_2})$, is suitably amplified by amplifier $A_2$ and demodulated in circuit $D_2$. On the other hand, the signal appearing at $R_3$ modulates a signal at frequency F′ (modulator $M_1$), and the signal collected after amplification and detection then biasses one of the electrodes of amplifier $A_2$, thus ensuring correction for the parasite amplitude modulation.

In order to obtain a current having an amplitude from generator G′ proportional to $$\frac{i_{s_1}-i_{s_2}}{i_{s_3}}$$

as indicated above, transformer MF is connected on one side to the control grid of pentode $A_2$ and on the other side of the output circuit of a band pass filter BF inserted in the cathode plate circuit common to the two pentodes. The outlet of amplifier $A_1D_1$, connected to the screen grid of $A_2$, supplies thereto a detected potential having an adjustable amplitude comprised, for example, between $U_2$ and $U_3$. The variation frequency of this potential is equal to the variation frequency of potential $U_g$, fed to the control grid of pentode $A_2$. If R is the load resistance of $A_2$, $s$ the variable transconductance of its characteristic $I_p=f(U_{g_1})$ with $I_p$ the plate current, then the amplitude of $U_{g_1}$, is equal to $K(i_{s_1}-i_{s_2})$. Hence the amplitude of the alternating potential at the terminals of load R is $U_1'=sRK(i_{s_1}-i_{s_2})$.

Judicious choice of pentode $A_2$ and of interval $U_2$–$U_3$ and the introduction of a degenerative feedback in the output circuit of the pentode, jointly give rise to the condition $$s=\frac{K_1}{i_{s_3}}$$

In these circumstances $$U_1'=RKK_1\left(\frac{i_{s_1}-i_{s_2}}{i_{s_3}}\right)$$

The degenerative feedback used may be, for example, a resistance $r$ common to the cathode-plate and cathode-control grid circuits. It is known that slope $s_f$ corresponding to this is obtained from transconductance $s$ above mentioned by the formula $$sf=\frac{s}{1+sr}$$

It will be seen from the foregoing that the advantages of discriminator systems according to the invention over known systems are as follows:

1. No use is made of preliminary change of frequency.

2. No use is made of amplitude limitation as such limitation being effected after discrimination by methods which are simpler than those hitherto applied.

3. It is possible to use amplifiers having relatively narrow working bands, since the maximum width of the band is equal to twice the highest modulation frequency of the signal, whereas in known receivers the amplifiers have a band of width equal to the modulation depth (generally greater than the highest modulation frequency).

4. The width of band which can be discriminated without linear distortion is much greater than in known receivers.

5. The same apparatus can be used for an extended range of carrier frequencies and of modulation depths.

The present invention is in no way limited by the present description which is given only by way of illustrative example, many variations and modifications being possible within the spirit and scope of the appended claims.

What I claim is:

1. In combination with a wave guide short-circuited at one end and supplied at the other end with amplitude and frequency modulated electro-magnetic waves of mean wave-length $\lambda_0$, three feeders coupled to said guide at three points, the distance between the first two feeders being equal to $$\frac{\lambda_0}{4}+n\lambda_0$$

and the distance from the third point to the short-circuited end of the guide being equal to $$n_1\frac{\lambda_0}{2}$$

wherein $n$ and $n_1$ are integers which may be equal to zero, means for adapting the impedance of said feeders to said guide, three detectors having quadratic responses and inserted, respectively on said feeders, the first two detectors being connected in mutually opposed relationship to their feeders coupled to the guide, a plural grid thermionic vacuum amplifier tube, means comprising modulating devices for obtaining a current having an amplitude proportional to the difference between the amplitudes $i_1$ and $i_2$ of the currents supplied by said two detectors to said modulating devices and for applying said current to one of the grids of said tube, means for amplifying the current of amplitude $i_3$ supplied by the third detector and for applying said amplified current to another grid of said tube, a demodulator connected to the outlet of said tube, and means for collecting from the output of said demodulator a low frequency current having an amplitude proportional to $$\frac{i_1-i_2}{i_3}$$

2. A device according to claim 1, wherein the modulating devices included in the means for obtaining a current having an amplitude proportional to the difference between the amplitudes of the currents supplied by said first two detectors, comprise paired pentode tubes having their control grids connected respectively to the output circuits of said two detectors, including also a source of oscillations with connections therefrom to the screen grids of said pentode tubes, and a band pass filter inserted in the common output circuit of said pentode tubes.

3. In combination with a wave guide connected at one end to a horn and closed at the other end by a wall of highly-conducting metal, said guide being fed with amplitude and frequency modulated electro-magnetic waves of mean wavelength $\lambda_0$, three coaxial lines coupled to said guide at three points, the distance from the third point to said wall being $$n\frac{\lambda_0}{2}$$

wherein $n$ is any integer and the distance between the first and second points being $$\frac{\lambda_0}{4}+n_1\lambda_0$$

wherein $n$ is an integer which may be equal to zero, means for adapting the impedance of said coaxial lines to said guide, three detectors having a quadratic response inserted respectively in the central conductors of said lines, the first two detectors corresponding to the first two points being connected in mutually opposed relationship, two identical modulating pentodes having control grids, connected respectively to the outlets of said two detectors, an auxiliary generator of frequency F′, connections between the outlet of said generator and the screen grids of said two pentodes, a pass-band filter inserted in the cathode-plate circuit common to both said pentodes, means for obtaining at the outlet of said filter a potential proportional to the difference between the respective amplitudes $i_1$ and $i_2$ supplied by said first two detectors, a thermionic modulating vacuum tube, connections between the cathode of said tube and the outlet of said third detector and between one of the grids of said tube and the outlet of said generator, an amplifying detector having its inlet connected to the outlet of said modulator, a final amplification pentode $A_2$, connections between the grid-screen of said pentode and the outlet of said amplifying detector, further connections between the control grid of said pentode and the output circuit of said pass-band filter, a demodualtor connected to the outlet of said pentode, and means for obtaining from the outlet of said demodulator a low frequency potential having an amplitude proportional to $$\frac{i_1 - i_2}{i_3}$$

4. A device as in claim 3 wherein the frequency F', is considerably higher than the highest one of the frequencies characterizing the periodic variation of the wave length of the wave received in the guide.

5. A device as in claim 3 wherein the passing band of the filter interposed between the paired pentodes and the final amplification pentode is at least equal to twice the higher modulation frequency of the wave received in the guide.

6. A device as in claim 3 including load resistances interposed between the first two detectors and the earth and constituting potentiometers respecting their energy transfer, and wherein the potentials applied to the control grids of the two paired pentodes are picked up from said resistances.

7. A device as in claim 3 wherein the coaxial lines coupled to the guide are slidably arranged in grooves provided in one wall of said guide and parallel to the axis thereof.

MARCEL DENIS.

REFERENCES CITED

The following references are of record in the file of this patent:

UNITED STATES PATENTS

| Number | Name | Date |
|---|---|---|
| 2,251,382 | Sziklai | Aug. 5, 1941 |
| 2,262,932 | Guanella | Nov. 18, 1941 |
| 2,363,649 | Crosby | Nov. 28, 1944 |
| 2,499,742 | Goodall | Mar. 7, 1950 |